(12) United States Patent
Huang et al.

(10) Patent No.: US 10,621,369 B2
(45) Date of Patent: Apr. 14, 2020

(54) PROTECTING METHOD FOR ACCESSING MATERIAL DATA OF PRINTER

(71) Applicants: XYZPRINTING, INC., New Taipei (TW); KINPO ELECTRONICS, INC., New Taipei (TW)

(72) Inventors: Chien-Ying Huang, New Taipei (TW); Kwan Ho, New Taipei (TW)

(73) Assignees: XYZPRINTING, INC., New Taipei (TW); KINPO ELECTRONICS, INC., New Taipei (TW)

( * ) Notice: Subject to any disclaimer, the term of this patent is extended or adjusted under 35 U.S.C. 154(b) by 221 days.

(21) Appl. No.: 15/585,150

(22) Filed: May 2, 2017

(65) Prior Publication Data
US 2018/0211052 A1 Jul. 26, 2018

(30) Foreign Application Priority Data
Jan. 20, 2017 (CN) .......................... 2017 1 0044799

(51) Int. Cl.
| G06F 21/60 | (2013.01) |
| H04N 1/44 | (2006.01) |
| B33Y 50/00 | (2015.01) |
| B29C 64/386 | (2017.01) |

(52) U.S. Cl.
CPC .......... *G06F 21/608* (2013.01); *B29C 64/386* (2017.08); *B33Y 50/00* (2014.12); *H04N 1/4486* (2013.01); *H04N 2201/0082* (2013.01)

(58) Field of Classification Search
CPC ..... G06F 21/608; B33Y 50/00; B29C 64/386; H04N 1/4486
See application file for complete search history.

(56) References Cited

U.S. PATENT DOCUMENTS

| 7,010,510 B1* | 3/2006 | Schellhorn ......... G06Q 10/0635 705/36 R |
| 2002/0169810 A1* | 11/2002 | Wilber ...................... G06F 7/58 708/250 |
| 2014/0082588 A1* | 3/2014 | Perkins ................... G06F 9/541 717/115 |

* cited by examiner

*Primary Examiner* — Joshua D Taylor
(74) *Attorney, Agent, or Firm* — Chun-Ming Shih; HDLS IPR Services

(57) ABSTRACT

A protecting method for accessing material data adopted by a printer having a processing unit, a MCU for storing material data, and a transmission interface is disclosed. The method includes following steps of: determining whether to decide a data format at the processing unit once the material data is to be saved or read; generating confirm signal to be transmitted to the MCU through the transmission interface if the data format needs to be decided; looking up a table or performing a calculation according to content of the confirm signal at both the processing unit and the MCU for obtaining a corresponding data format; and, generating and transmitting transmission signal which includes the material data based on the corresponding data format by the processing unit and the MCU.

17 Claims, 10 Drawing Sheets

PROTECTING METHOD FOR ACCESSING MATERIAL DATA OF PRINTER

BACKGROUND OF THE INVENTION

Field of the Invention

The present disclosure relates to a method for accessing data of printer, especially to a protecting method for accessing data of printer.

Description of Prior Art

In view of the mature 3D printing technology, and reduced volume and price of various 3D printers, the 3D printer develops rapidly in recent years.

A general 3D printer mainly controls a nozzle according to a 3D drawing document imported, and uses the nozzle to spray a material (for example, a thermoplastic filament) to a printing platform, thus the material is stacked to be a 3D object corresponding to the 3D drawing document on the printing platform.

As mentioned above, the material is the printer supplies, and needs to be replaced when run out. For reminding the user of replacing the material, the printer keeps recording a material data during printing (generally, an amount of the material decreases when the printing increase).

However, some manufactures would gain profit of selling the material by hacking the printer. Namely the illegal manufactures modify the material data stored in memory, to allow a user to replace the material of the printer with any other material provided by any manufacture.

Please refer to FIG. 1 and FIG. 2, which respectively shows a block diagram of a printer of a first related technology and a block diagram of a printer of a second related technology. FIG. 1 discloses a printer 1 including a printing mechanism 10, a processing unit 11, an encrypting unit 12, a decrypting unit 13 and a transmission interface 14, while FIG. 2 discloses a printer 1' including the above elements 10-14 and a wireless reading device 15.

The printing mechanism 10 uses a material 100 to perform printing of a 3D object. The processing unit 11 processes a material data of the material 100. The encrypting unit 12 encrypts the material data to be written to a storing device 2 or the material data of a wireless label 4. The decrypting unit 13 decrypts the material data read from the storing device 2 or the material data of the wireless label 4.

The printer 1 shown in FIG. 1 is physically connected the stores device 2 through the transmission interface 14, to read/write the material data, while the printer 1' shown in FIG. 2 is connected to a wireless reading device 15 through the transmission interface 14, and transmits the material data wirelessly through the wireless reading device 15 and the wireless label 4.

In related technology, the transmission interface 14 mainly adopts standard communication protocol, such as transmission interface like inter-integrated circuit (I2C), serial peripheral interface (SPI), universal asynchronous receiver/transmitter (UART) etc., thus cost of the printer 1, 1' can be reduced and compatibility can be increased.

The communication protocols adopted by the transmission interface 14 are all standard communication protocols, and data formats and data access method adopted by the communication protocols are also publicly disclosed, thus any one can learn the method of accessing data transmitted by the communication protocols.

As mentioned above, in the currently related technology, a third user only needs to replicate of the material data (such as data indicating the data with fully loaded data) of needed content, and writes the material data replicated illegally to the storing device 2 or the wireless label 4, by a first transmission channel 31 connected to the transmission interface 14 and the storing device 2, or a second transmission channel 32 connected to the transmission interface 14 and the wireless reading device 15, then the material 100 of the printer 1, 1' can be replaced by any other material.

However, the material of other varieties may be not compatible with the printer 1, 1', and resulting in the printer 1, 1' damaged during printing.

SUMMARY OF THE INVENTION

The present disclosure provides a printer 的 material data accesses protecting method, the printer generates and transmits a transmission signal including a material data therein for different formats when storing or reading the material data each time, thus the accessing of the printer is protected.

In an exemplary embodiment of the present disclosure, the method is adopted by a printer including a processing unit, a MCU and a transmission interface. The MCU stores a material data. The processing unit storing/reading the material data determines if a data format adopted by the action needs to be decided. If the data format needs to be decided, a confirm signal is generated and transmitted to the MCU by the transmission interface. Next, the processing unit and the MCU looks up table or performs calculation respectively according to a content of the confirm signal to obtain the corresponding data format. Finally, the processing unit and the MCU respectively generates and transmits a transmission signal including the material data therein by the corresponding data format.

Compared to the related technology, the printer of the present disclosure can change the data format adopted by the signal transmitted between the processing unit and the micro controlling unit at any time, thus even the signal is stolen during the transmission, a third person not understanding the data format cannot recognize the material data in the signal. In this way, the inner data of the printer can be effectively protected against being randomly accessed and modified by the third person.

BRIEF DESCRIPTION OF DRAWING

One or more embodiments of the present disclosure are illustrated by way of example and not limitation in the figures of the accompanying drawings, in which like references indicate similar elements. These drawings are not necessarily drawn to scale.

DETAILED DESCRIPTION OF THE INVENTION

Figure 1:
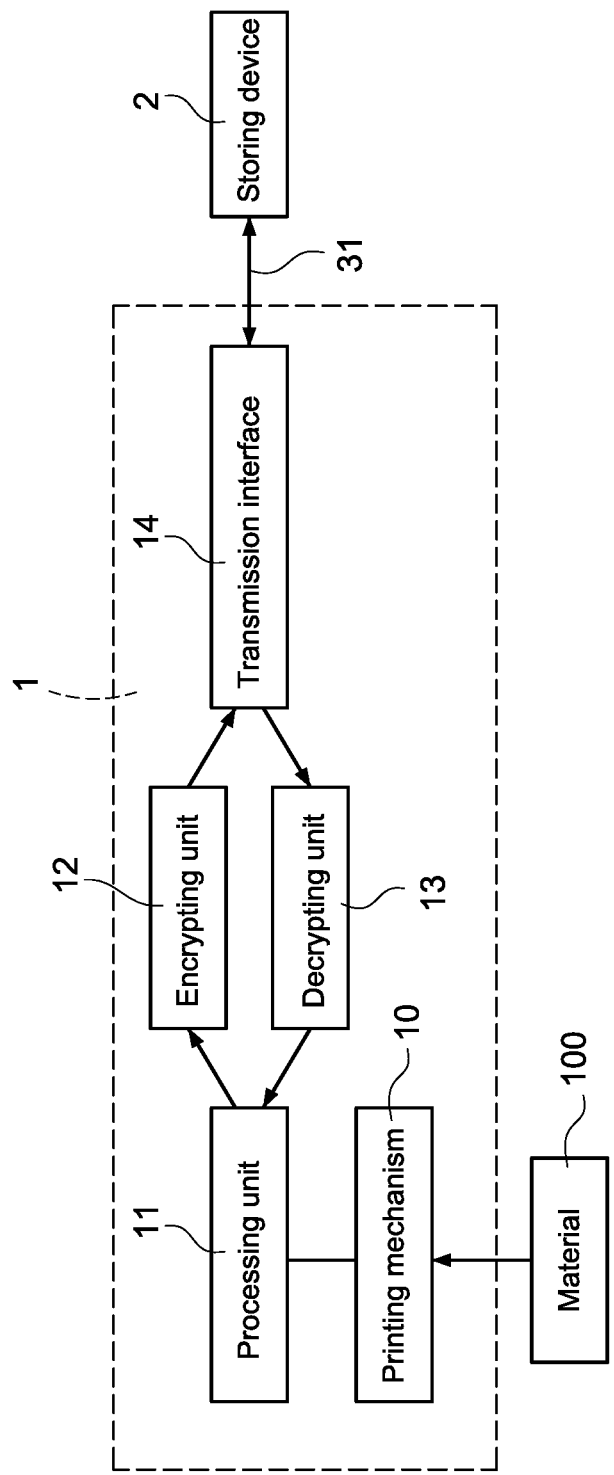
FIG. 1 shows block diagram of a printer of a first related technology.
Figure 2:
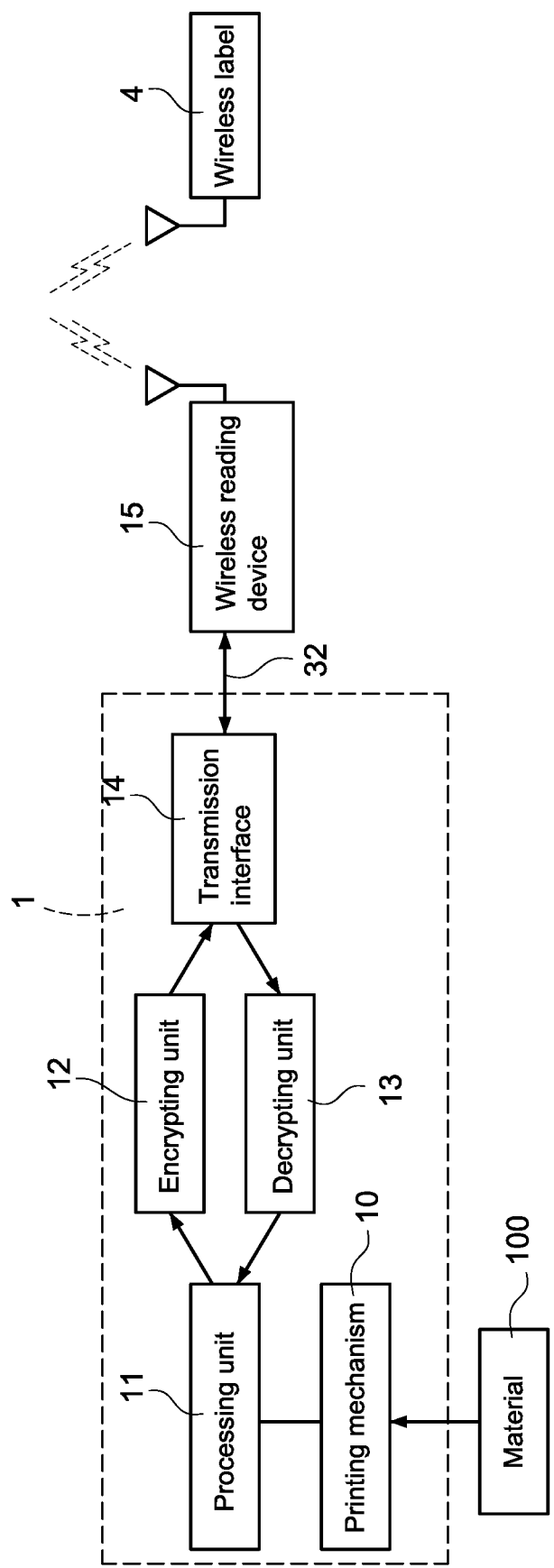
FIG. 2 shows block diagram of a printer of a second related technology.
Figure 3:
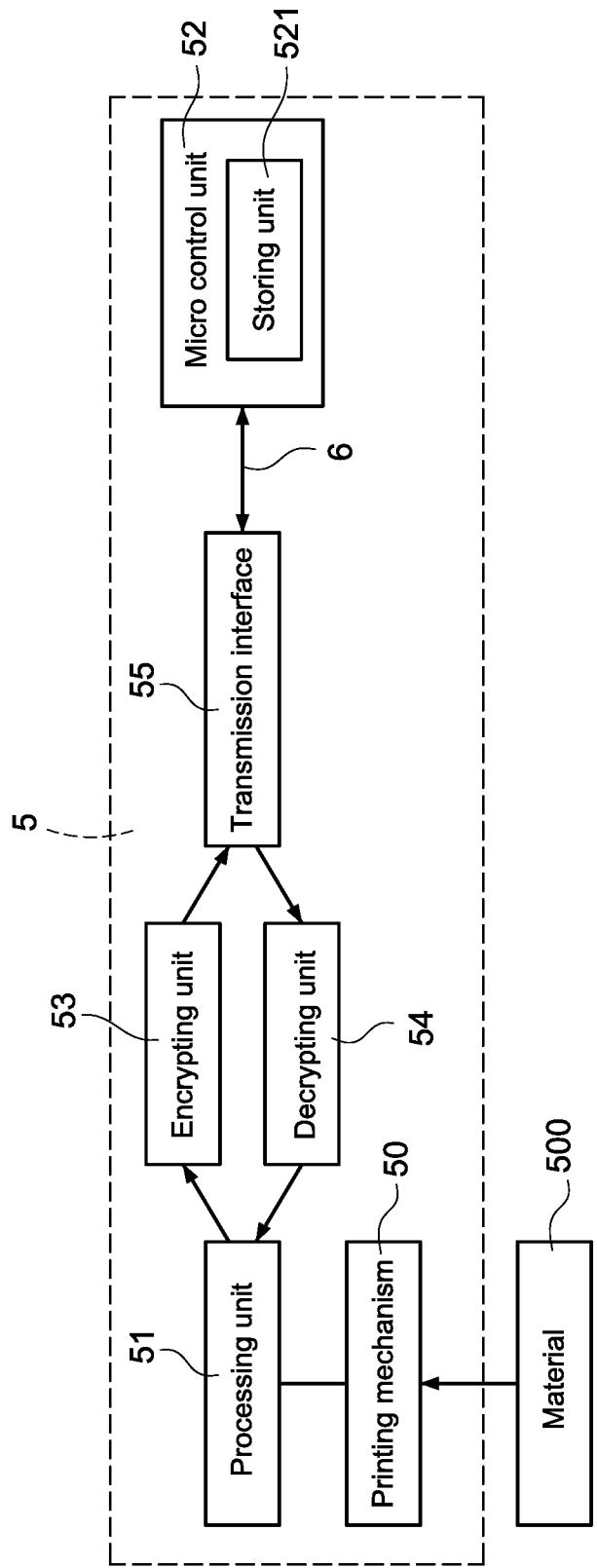
FIG. 3 shows block diagram of a printer of a first specific exemplary embodiment of the present disclosure.

Refer to FIG. 3, FIG. 3 shows block diagram of a printer of a first specific exemplary embodiment of the present disclosure. The present disclosure discloses a protecting method for accessing data of printer (hereafter the method), and the method adopted by a printer 5 shown in FIG. 3. Specifically, the method of the present disclosure is adopted by various 3D printers printing 3D object.

As shown in FIG. 3, the printer 5 mainly includes a printing mechanism 50, a processing unit 51, an MCU 52, an encrypting unit 53, a decrypting unit 54 and a transmission interface 55.

The printing mechanism 50 fills a material 500, and sprays the material 500 on a print platform (not shown) for stacking to form the 3D object. Regard a fused deposition modeling (FDM) 3D printer as an example, the material 500 can be an FDM filament, but not limit. The processing unit 51 is electrically connected to the printing mechanism 50, controls the printing of the printing mechanism 50, and keeps recording the use of the material 500 during printing (recording length of the residual filament in the aforementioned example).

The encrypting unit 53 and the decrypting unit 54 are respectively electrically connected to the processing unit 51 and the transmission interface 55, while the transmission interface is electrically connected to the encrypting unit 53, the decrypting unit 54 and the MCU 52.

If the printer 5 needs to perform storing, the processing unit 51 generates a material data (as the material data 5211 shown in FIG. 4B), and encrypts the material data transmitted to the encrypting unit 53 according to the use of the material 500, then transmits the material data to the transmission interface 55, and the transmission interface 55 transmits the material data 5211 through the transmission channel 6 to the MCU 52 to be stored. Specifically, the MCU 52 further includes a storing unit 521, the MCU 52 storing the material data 5211 by the storing unit 521.

If the printer 5 is to perform reading, the MCU 52 transmits, through the transmission channel 6, the material data 5211 stored therein to the transmission interface 55, the transmission interface 55 transmits the material data 5211 to the decrypting unit 54 to be decrypted, then transmits the decrypted material data 5211 to the processing unit 51, in order to analyze the decrypted material data 5211 by the processing unit 51.

In the exemplary embodiment, the transmission interface 55 is mainly universal transmission interface of various standards, such as inter-integrated circuit (I2C), serial peripheral interface (SPI), universal asynchronous receiver/transmitter (UART), and the like. The present disclosure is mainly characterized in that the processing unit 51 and the MCU 52 packages (according to a non-particular data format) a storing command, a reading command and the material data 5211 into a customized transmission signal, then performs transmitting through the transmission channel 6. In this way, even a third person hacks the printer 5 and steals the transmission signal through the transmission channel 6, the storing command, the reading command and the material data 5211 cannot be reduced because of the data format adopted by the inappreciable transmission signal, thus the inner data of the printer 5 can be effectively protected against illegal replication and modification.

Figure 4B:
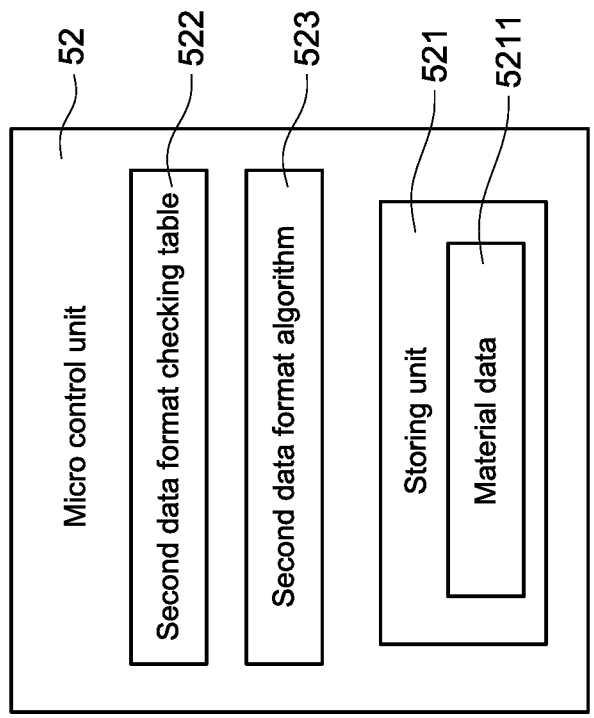
FIG. 4B shows block diagram of a MCU of a first specific exemplary embodiment of the present disclosure.
Figure 4A:
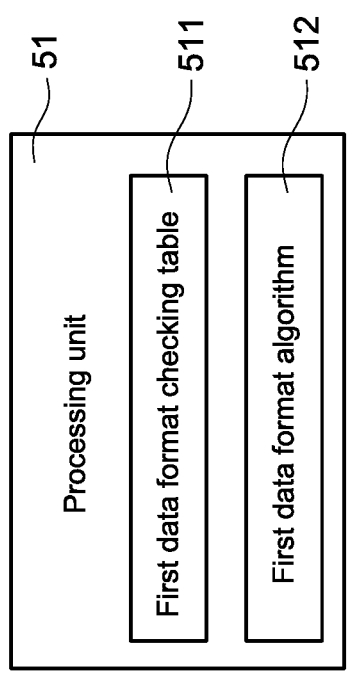
FIG. 4A shows block diagram of a processing unit of a first specific exemplary embodiment of the present disclosure.

Please refer to both FIG. 4A and FIG. 4B, which respectively shows a block diagram of a processing unit of a first specific exemplary embodiment of the present disclosure, and a block diagram of a MCU of a first specific exemplary embodiment of the present disclosure. As shown in FIG. 4A and FIG. 4B, the processing unit 51 includes a first data format checking table 511 and a first data format algorithm 512, the MCU 52 includes a second data format checking table 522 and a second data format algorithm 523. The first data format checking table 511 corresponds to the second data format checking table 522, the first data format algorithm 512 equals to the second data format algorithm 523. The MCU 52 also includes the storing unit 521 built in, the storing unit 521 stores the material data 521 of the printer 5. The material data 521 indicates a residual amount of the material 500 currently used by the printing mechanism 50.

In an exemplary embodiment of the present disclosure, the processing unit 51 and the MCU 52 looks up the first data format checking table 511 and the second data format checking table 522, to obtain the data format adopted by the signal to be transmitted. In another exemplary embodiment of the present disclosure, the processing unit 51 and the MCU 52 perform an immediate calculation by the first data format algorithm 512 and the second data format algorithm 523, to decide the data format adopted by the signal to be transmitted (descripted in detail later).

Figure 5A:
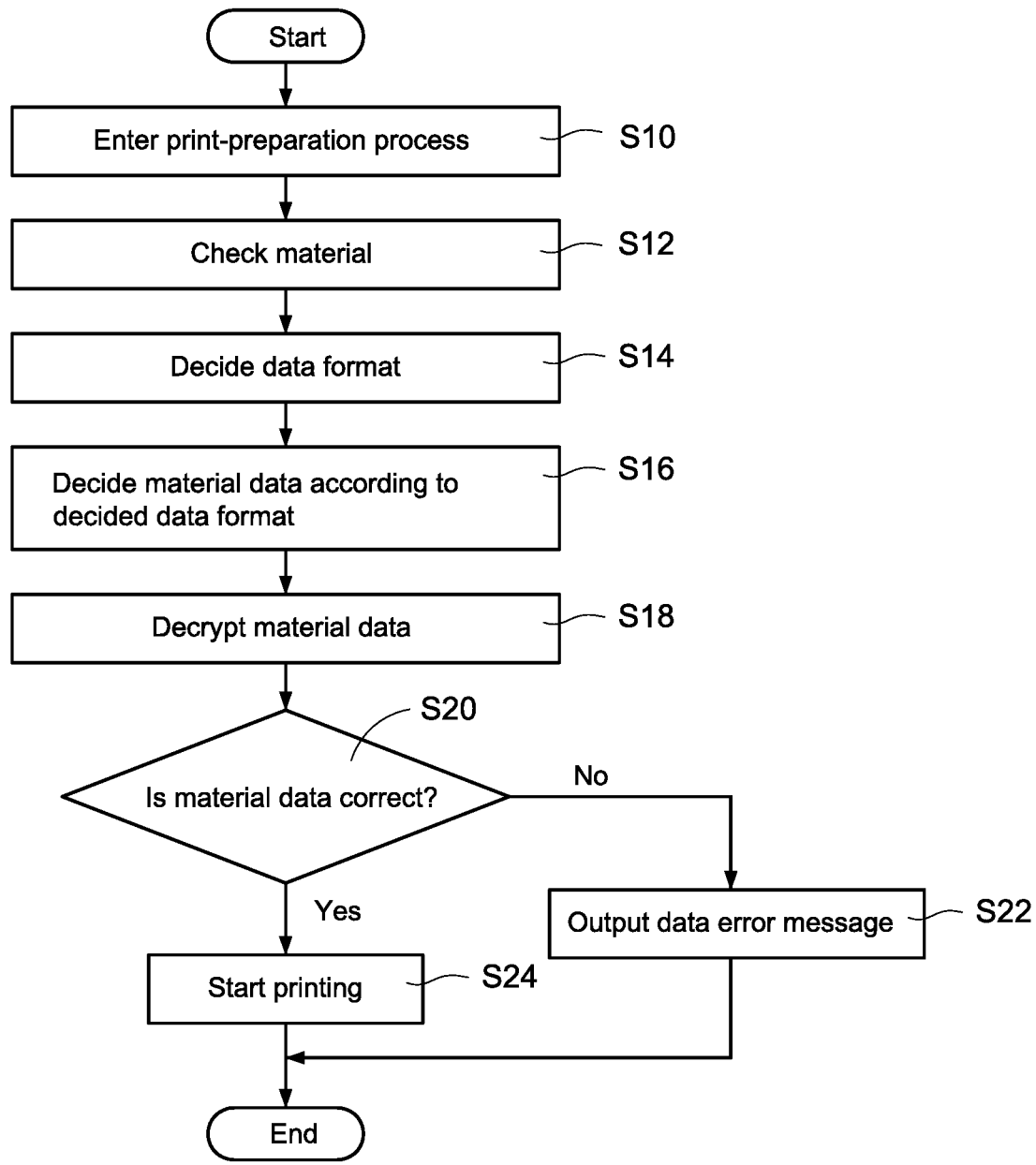
FIG. 5A shows a flowchart before printing of a first specific exemplary embodiment of the present disclosure.

Please refer to FIG. 5A, FIG. 5A shows a flowchart before printing of a first specific exemplary embodiment of the present disclosure. If the 3D object is to be printed, the printer 5 enters a print-preparation process (step S10) first, and checks the material 500 (step S12). Next, the printer 5 decides a data format (step S14) through the method of the present disclosure. Next, the processing unit 51 (according to the data format decided in step S14) decides the material data 5211 (step S16) read from the MCU 52. After step S16, the printer 5 decrypts the material data 5211 (step S18), and determines if the material data 5211 is correct (step S20). The printer 5 outputs a data error message if the material data 5211 is determined to be incorrect (step S22), and starts printing if the material data 5211 is determined to be correct (step S24).

Figure 5B:
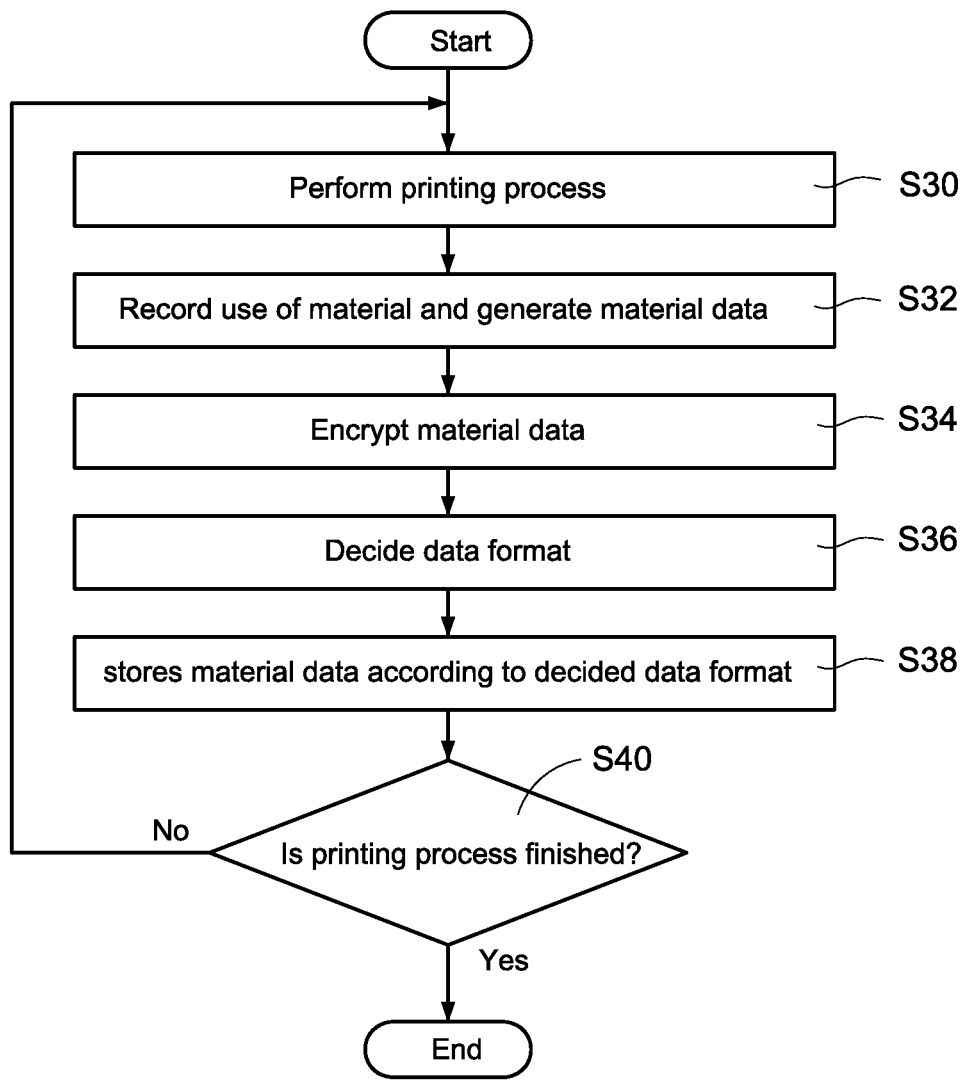
FIG. 5B shows a flowchart during printing of a first specific exemplary embodiment of the present disclosure.

Refer to FIG. 5B, FIG. 5B shows a flowchart during printing of a first specific exemplary embodiment of the present disclosure. After step S24 in FIG. 5A, the printer 5 may perform a printing process (step S30), and may record the use of the material 500 and generate the material data 5211 (step S32) during the printing. Next, the printer 5 encrypts the material data 5211 (step S34), and decides a data format by the method of the present disclosure (step S36). Next, the processing unit 51 stores (according to the data format decided in step S36) the material data 5211 to the MCU 52 (step S38). Finally, the printer 5 determines if the printing process is already finished (step S40), and repeats step S30 to step S38 before the printing is finished.

According to the present disclosure, the printer 5 can keep generating and transmitting the material data 5211 (with non-particular data format from multiple data formats) during the printing of the 3D object, by the scheme of FIG. 5A and FIG. 5B, thus preventing the material data 5211 from being replicated illegally, and preventing the data of the MCU 52 from being modified illegally.

Figure 6:
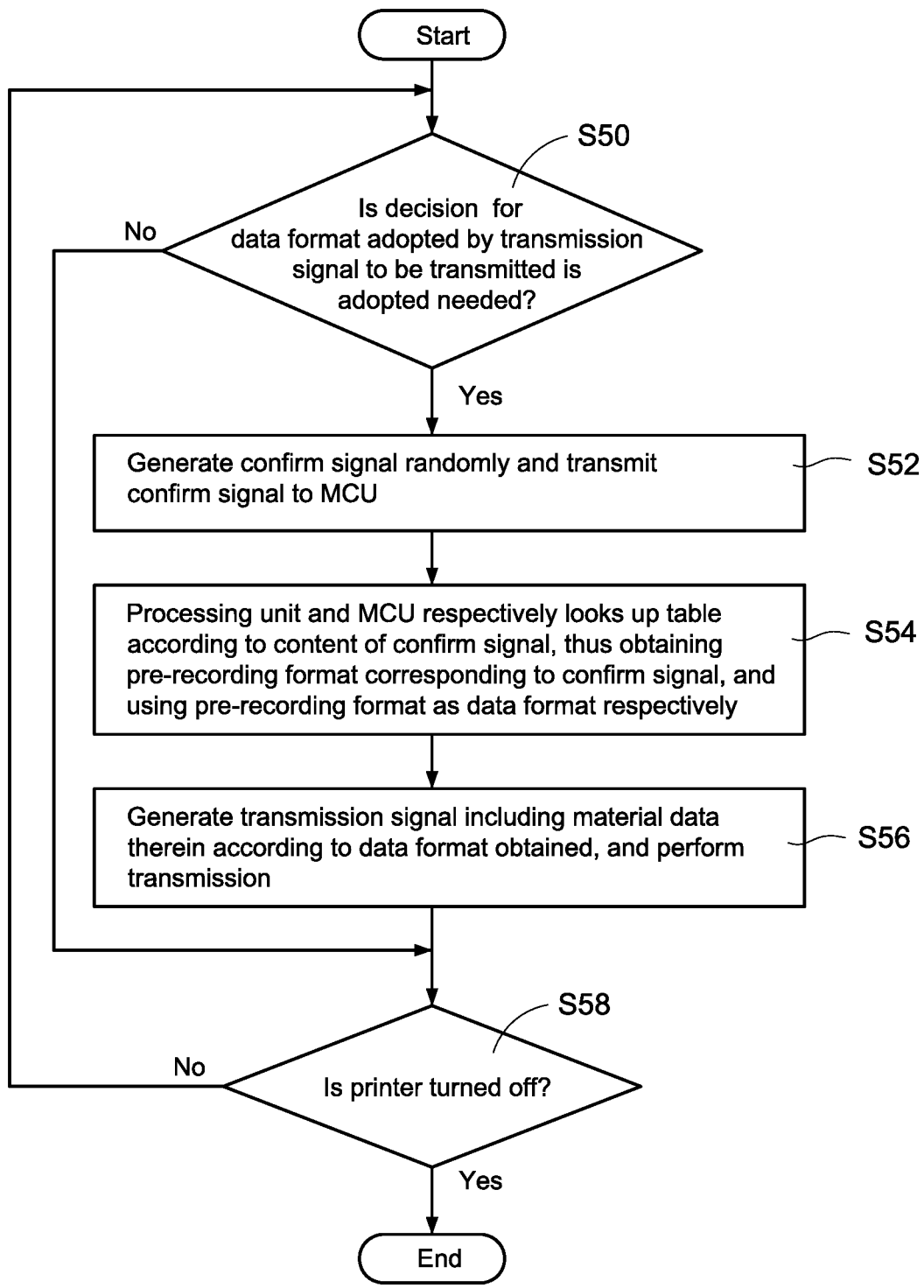
FIG. 6 shows a flowchart of data accessing of a first specific exemplary embodiment of the present disclosure.

Refer to FIG. 6, FIG. 6 shows a flowchart of data accessing of a first specific exemplary embodiment of the present disclosure. In the present disclosure, the printer 5 mainly uses the processing unit 51 to determine, in any time point, whether the data format, which a transmission signal to be transmitted is adopted to, is needed to be determined (step S50). If the decision for the data format is needed, a confirm signal is generated randomly and transmitted to the MCU 52 (step S52). In the exemplary embodiment, the confirm signal can be an analog signal (for example, a voltage sent from the processing unit 51 to the MCU 52, or a voltage sent from the MCU 52 to the processing unit 51) or a digital signal (for example, a value or a initialization signal), not limited.

The processing unit 51 mainly receives an enabling signal, and determines whether the decision for the data format is needed. Specifically, the processing unit 51 can receive the enabling signal when the printer 5 is turned on, receive the enabling signal when storing or reading the material data 5211 each time, or receive the enabling signal at a predetermined interval (for example, 1 hour), not limited. Moreover, the enabling signal can be a resetting signal, that is, the processing unit 51 generates and transmits the confirm signal to the MCU 52 randomly when receiving the resetting signal each time, in this way, the processing unit 51 decides (together with the MCU 52) the data format adopted by the next transmission signal to be transmitted.

After step S52, the processing unit 51 and the MCU 52 respectively looks up table (according to the content of the confirm signal), thus obtaining a pre-recording format corresponding to the confirm signal, and using the pre-recording format as the data format respectively (step S54). Specifically, the data format (i.e. the pre-recording format) can be a length of the transmission signal, and a distribution rule for command and data (included in the transmission signal) distributed in the transmission signal.

For example, a first data format (corresponding to a first pre-recording format) can be defined to be 10-bit, wherein the first 4 bits indicate the command content, the succeeding 6 bits indicate the data content. A second data format (corresponding to two first pre-recording formats) can be defined to be 10-bit, wherein the first 5 bits indicate the command content, the succeeding 5 bits indicate the data content. A third data format (corresponding to a third pre-recording format) can be defined to be 10-bit, wherein the first 7 bits indicate the data content, the succeeding 3 bits indicate the command content. A fourth data format (corresponding to a fourth pre-recording format) can be defined to be 16-bit, wherein the first 10 bits indicate the command content, the succeeding 6 bits indicate the data content. A fifth data format (corresponding to a fifth pre-recording format) can be defined to be 16-bit, wherein the 1st to 3rd bits, 7th to 8th bits indicate the command content, the 4th to 6th bits, 9th to 10th bits indicate the data content, not limited.

Next, the processing unit 51 and the MCU 52 generate (according to the data format obtained in step S54) the transmission signal including the material data 5211 therein, and perform transmission through the transmission interface (step S56). In an exemplary embodiment, the transmission signal also includes an access command. In the exemplary embodiment, the access command can be a storing command, a reading command or a combination of both above, and the transmission signal can be generated by the processing unit 51, or generated by the MCU 52, not limited.

After step S56, the processing unit 51 determines if the printer 5 is turned off (step S58), and repeats step S50 to step S56 before the printer 5 is turned off, in this way, the data format adopted by the signal to be transmitted is changed continually when necessary (for example, a next signal is to be transmitted, reset, a predetermined time is passed), and thus safety of the data of the printer 5 is improved.

Figure 7:
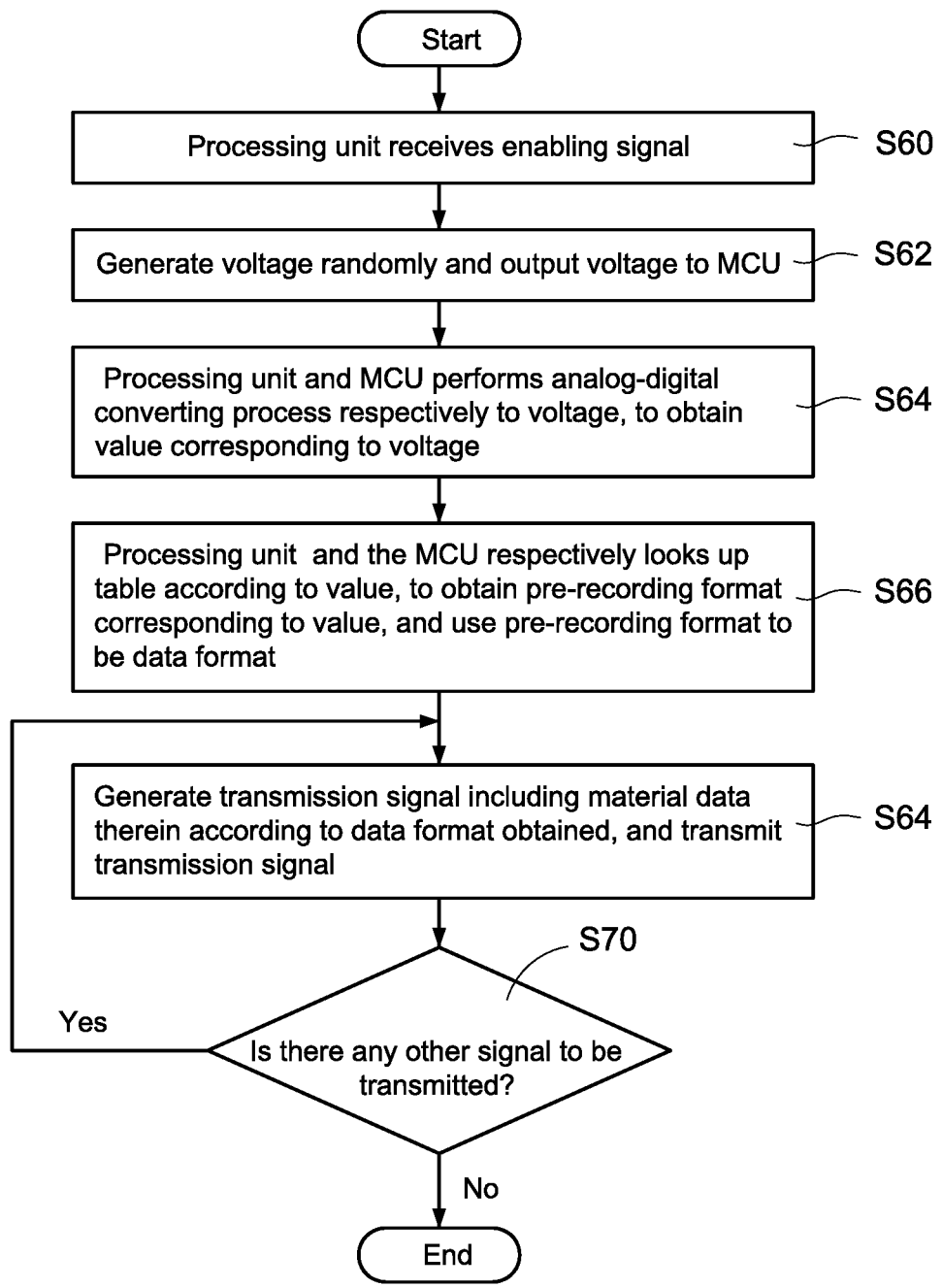
FIG. 7 shows a flowchart of data accessing of a second specific exemplary embodiment of the present disclosure.

Then please refer to FIG. 7, FIG. 7 shows a flowchart of data accessing of a second specific exemplary embodiment of the present disclosure. The embodiment shown in FIG. 7 is a variation of that shown in FIG. 6, and can be encompassed by the range of the embodiment shown in FIG. 6.

In the exemplary embodiment, the processing unit 51 receives an enabling signal when the printer 1 is turned on (step S60), and determines whether a decision for the data format of the signal to be transmitted is needed when receiving the enabling signal. Specifically, the processing unit 51 generates a voltage randomly after receiving the enabling signal, and outputs the voltage to the MCU 52 (step S62). The voltage is the confirm signal shown in FIG. 6 (i.e. the analog signal). However, in another exemplary embodiment, the voltage also can be generated by the MCU 52, and the voltage is outputted to the processing unit 51 by the MCU 52, not limited.

After step S62, the processing unit 51 and the MCU 52 performs an analog-digital converting process respectively to the voltage, to obtain a value corresponding to the voltage (step S64). It needs to be noted that, the processing unit 51 and the MCU 52 perform the same analog-digital converting process to the voltage, thus the same value can be obtained. In the exemplary embodiment, the value can be an integer value, a binary value, an octal value, a hexadecimal value, and the like, not limited.

Next, the processing unit 51 and the MCU 52 respectively looks up table according to the value, to obtain a pre-recording format corresponding to the value, and use the pre-recording format to be the data format (step S66). Specifically, in step S66, the processing unit 51 looks up the first data format checking table 511 embedded according to the value, to obtain the pre-recording format corresponding to the value, and the MCU 52 looks up the second data format checking table 522 embedded according to the value, to obtain the pre-recording format corresponding to the value.

As mentioned above, the first data format checking table 511 equals to the second data format checking table 522 in the present disclosure, thus the pre-recording formats obtained by the processing unit 51 and the MCU 52 looking up are the same. In this way, no matter the transmission signal is generated (according to the data format) by the processing unit 51 or the MCU 52, a unit receiving the transmission signal can successfully recognize the material data 5211 included in the transmission signal.

More specifically, the first data format checking table 511 and the second data format checking table 522 respectively records correspondence between a plurality of the values, a plurality of the pre-recording formats and each of the values and each of the pre-recording formats. For example, a binary value 0001 corresponds to a first pre-recording format; a binary value 0010 corresponds to a second pre-recording format, and so on.

It needs to be noted that, the processing unit 51 and the MCU 52 can respectively by a same analog-digital converter (ADC) to perform the analog-digital converting process in step S64. In an exemplary embodiment, the analog-digital converter is a 10-bit converter, and can generates $2^{10}$ (1024) values. In the exemplary embodiment, the first data format checking table 511 and the second data format checking table 522 can respectively record 1024 values, 1024 pre-recording formats, and correspondence between each of the value and each of the pre-recording format. However, the aforementioned is only a specific exemplary embodiment of the present disclosure, but not limited.

After step S66, the processing unit 51 and the MCU 52 generate (according to the data format obtained in step S66) the transmission signal including the material data 5211 therein, and transmit the transmission signal through the transmission interface 55 (step S68). In another exemplary embodiment, step S68 also generates (according to the data format) the transmission signal including both an access command and the material data 5211 therein, not limited.

After step S68, the processing unit 51 determines if there is any other signal to be transmitted (step S70). If there is other signal to be transmitted in the following, then step S68 is executed again, to generate and transmit the next transmission signal according to the data format obtained in step S66. Preferably, the next transmission signal also includes the material data 5211, or includes the access command and the material data 5211.

In the exemplary embodiment, the processing unit 51 receives the enabling signal (for example, after the printer 5 is turned on) and then decides the data format, and generates and transmits the transmission signal according to the data format. However, in other exemplary embodiment, the processing unit 51 and the MCU 52 also decide the adopted data format again when storing or reading the material data 5211 each time, thus safety of the printer 5 can be effectively improved.

Figure 8:
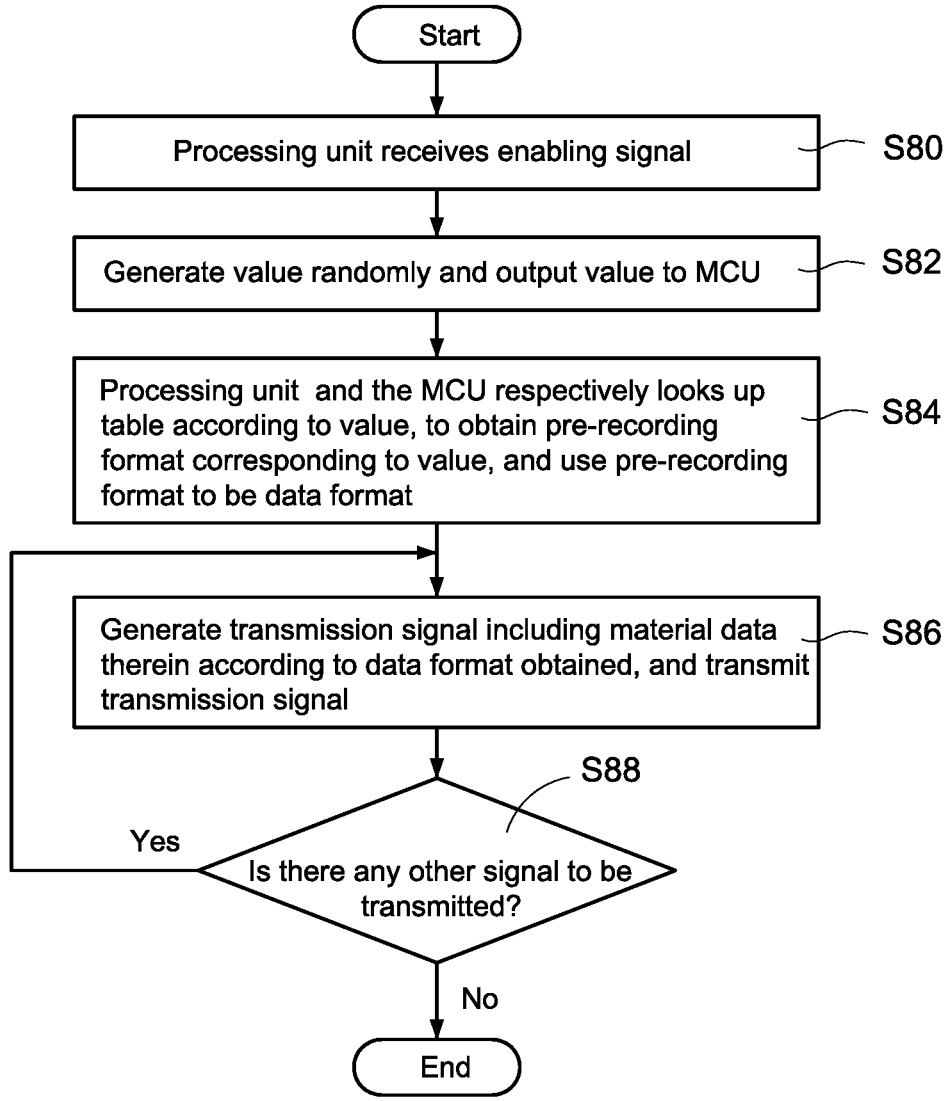
FIG. 8 shows a flowchart of data accessing of a third specific exemplary embodiment of the present disclosure.

Then please refer to FIG. 8, FIG. 8 shows a flowchart of data accessing of a third specific exemplary embodiment of the present disclosure. The embodiment shown in FIG. 8 is another variation of that shown in FIG. 6, and can be covered by the range of the embodiment shown in FIG. 6.

A difference between the embodiment in FIG. 8 and the second specific exemplary embodiment in FIG. 7 is that the processing unit 51 receives an enabling signal when the printer 1 is turned on in the exemplary embodiment (step S80), but the processing unit 51 directly generates a value randomly without generating the aforementioned voltage, and transmits the value to the MCU 52 (step S82). In the exemplary embodiment, the value is the confirm signal shown in FIG. 6, and the same as the value in FIG. 7. Specifically, if the confirm signal is the value (i.e. digital signal), then the processing unit 51 can adopt a standard data format of the transmission interface 55 to generate and transmit the confirm signal to the MCU 52.

After step S82, the processing unit 51 and the MCU 52 looks up table respectively according to the value, to obtain a pre-recording format corresponding to the value respectively, and to use the pre-recording format to be the data format (step S84). After step S84, the processing unit 51 and the MCU 52 can generate the transmission signal including the material data 5211 therein according to the data format obtained, and can transmit the transmission signal through the transmission interface 55 (step S86). In another exemplary embodiment, step S86 also can generate the transmission signal including both of an access command and the material data 5211 therein according to the data format, not limited.

After step S86, the processing unit 51 determines if there is any other signal to be transmitted (step S88). If there is other signal to be transmitted in the following, then step S86 is executed again, to generate and transmit the next transmission signal according to the data format. Preferably, the next transmission signal also includes the material data 5211, or includes the access command and the material data 5211. Moreover, the processing unit 51 and the MCU 52 also decide the adopted data format again when storing or reading the material data 5211 each time, not limited.

The aforementioned step S84 to step S88 are the same as or similar to step S66 to step S70 shown in FIG. 7, thus detailed description is not repeated here.

Figure 9:
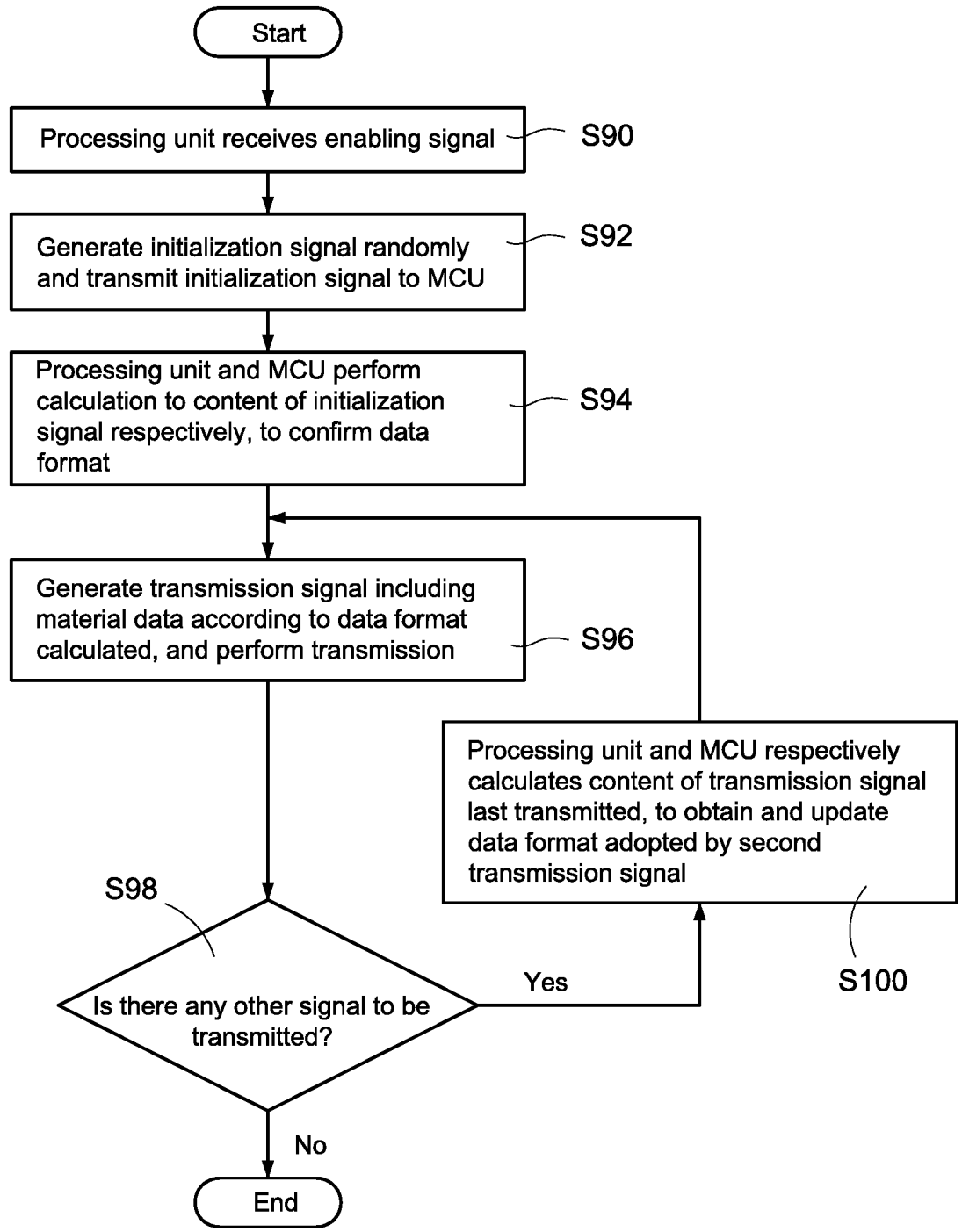
FIG. 9 shows a flowchart of data accessing of a fourth specific exemplary embodiment of the present disclosure.

Refer to FIG. 9, FIG. 9 shows a flowchart of data accessing of a fourth specific exemplary embodiment of the present disclosure. The embodiment shown in FIG. 9 is a variation of that shown in FIG. 6, and can be encompassed by the range of the embodiment shown in FIG. 6.

A difference between the aforementioned second specific exemplary embodiment and the third specific exemplary embodiment is that the processing unit 51 receives an enabling signal when the printer 1 is turned on in the exemplary embodiment (step S90), but the processing unit 51 generates an initialization signal without generating the aforementioned voltage and value, and transmits the initialization signal to the MCU 52 (step S92). In the exemplary embodiment, the initialization signal is the confirm signal shown in FIG. 6. Specifically, the initialization signal adopts a standard data format of the transmission interface 55, and a content of the initialization signal is generated randomly, or a current date and time of the printer 5, not limited.

In the exemplary embodiment, the data format is generated according to the content of the initialization signal, thus the content is not important. Besides, even the initialization signal is stolen by a third person, but the third person cannot recognize the data format adopted by the signal to be transmitted by the printer 5 by the content of the initialization signal, thus the exemplary embodiment adopts the standard data format to generate and transmit the initialization signal, and the safety of the printer 5 will not be influenced.

After step S92, the processing unit 51 and the MCU 52 perform calculation to the content of the initialization signal respectively, to confirm the data format (step S94). Specifically, in step S94, the processing unit 51 uses the first data format algorithm 512 embedded to calculate the content of the initialization signal, to confirm the data format, and the MCU 52 uses the second data format algorithm 523 embedded to calculate the content of the initialization signal, to confirm the data format. As mentioned above, the first data format algorithm 512 equals to the second data format algorithm 523, thus the processing unit 51 and the MCU 52 may obtain the same data format after calculation.

After step S94, the processing unit 51 and the MCU 52 generate the transmission signal including the material data 5211 according to the data format calculated, and use the transmission interface 55 to perform transmission (step S96). In another exemplary embodiment, step S96 also generates the transmission signal including both of an access command and the material data 5211 therein according to the data format, not limited. Specifically, the access command can be a storing command or a reading command; the transmission signal can be generated by the processing unit 51 and transmitted to the MCU 52, or generated by the MCU 52 and transmitted to the processing unit 51, not limited.

After step S96, the processing unit 51 determines if there is any other signal to be transmitted (such as a second transmission signal) (step S98). If there is other signal to be transmitted in the following, then the processing unit 51 and the MCU 52 respectively calculates the content of the transmission signal last transmitted, to obtain and update the data format adopted by the second transmission signal (step S100). Next, returning to step S96, the processing unit 51 and the MCU 52 generate and transmit the second transmission signal according to the data format updated. Preferably, the second transmission signal also includes the material data 5211, or includes the access command and the material data 5211.

The printer 5 may use the method to generate and transmit each transmission signal by different data formats, to store or read the material data 5211, thus effectively preventing the third person from recognizing the material data 5211, or recognizing the access command and the material data 5211 included by the transmission signal after stealing the transmission signal, and the data of the printer can be effectively protected against being replicated and modified by the third person.

Thus, particular embodiments have been described. Other embodiments are within the scope of the following claims. For example, the actions recited in the claims may be performed in a different order and still achieve desirable results.

What is claimed is:

1. A protecting method for accessing material data of printer, adopted by a printer having a processing unit used for controlling a printing mechanism, an MCU used for storing a material data and connected to a transmission interface of the processing unit and the MCU, the method comprising:
   a) generating a confirm signal with random content and transmitting the confirm signal to the MCU by the processing unit;
   b) looking up a table according to a content of the confirm signal at both the processing unit and the MCU for respectively obtaining a pre-recording format corresponding to the confirm signal to be a data format; and
   c) generating and transmitting a transmission signal including the material data according to the data format by the processing unit and the MCU through the transmission interface.

2. The protecting method for accessing material data of printer of claim 1, wherein the processing unit executes the step a) when receiving an enabling signal.

3. The protecting method for accessing material data of printer of claim 2, wherein the processing unit receives the enabling signal when the printer is turned on.

4. The protecting method for accessing material data of printer of claim 2, wherein the processing unit receives the enabling signal when storing or reading the material data each time.

5. The protecting method for accessing material data of printer of claim 2, wherein the enabling signal is a resetting signal.

6. The protecting method for accessing material data of printer of claim 2, wherein the confirm signal is a value, step b) is looking up a first data format checking table embedded at the processing unit according to the value, to obtain the pre-recording format corresponding to the value, and looking up a second data format checking table embedded at the MCU according to the value, to obtain the pre-recording format corresponding to the value, wherein the first data format checking table equals to the second data format checking table, and respectively records a plurality of the values, a plurality of the pre-recording formats and a correspondence between each of the values and each of the pre-recording formats.

7. The protecting method for accessing material data of printer of claim 6, wherein the processing unit adopts a standard data format of the transmission interface to generate and transmit the confirm signal to the MCU.

8. The protecting method for accessing material data of printer of claim 2, wherein step a) is generating and outputting a voltage randomly, and step b) comprises the following steps:
   b1) performing an analog-digital converting process to the voltage at the processing unit and the MCU to obtain a value;
   b2) looking up a first data format checking table embedded at the processing unit according to the value, to obtain the pre-recording format corresponding to the value; and
   b3) looking up a second data format checking table embedded at the MCU according to the value, to obtain the pre-recording format corresponding to the value, wherein the first data format checking table equals to the second data format checking table, and respectively records a plurality of the values, a plurality of the pre-recording formats and a correspondence between each of the values and each of the pre-recording formats.

9. The protecting method for accessing material data of printer of claim 2, wherein the MCU includes a storing unit, the material data is stored in the storing unit.

10. A protecting method for accessing material data of printer, adopted by a printer having a processing unit used for controlling a printing mechanism, an MCU used for storing a material data and connected to a transmission interface of the processing unit and the MCU, comprising:
    a) generating an initialization signal with random content and transmitting the initialization signal to the MCU by the processing unit, wherein the initialization signal adopts a standard data format of the transmission interface;
    b) performing calculation to a content of the initialization signal at the processing unit and the MCU respectively, to confirm a data format; and
    c) generating and transmitting a first transmission signal including the material data according to the data format by the processing unit and the MCU through the transmission interface.

11. The protecting method for accessing material data of printer of claim 10, wherein the content of the initialization signal is a current date and time of the printer.

12. The protecting method for accessing material data of printer of claim 10, wherein the processing unit executes the step a) when receiving an enabling signal.

13. The protecting method for accessing material data of printer of claim 12, wherein the processing unit receives the enabling signal when the printer is turned on.

14. The protecting method for accessing material data of printer of claim 12, wherein the enabling signal is a resetting signal.

15. The protecting method for accessing material data of printer of claim 12, wherein step b) is performing calculation to a content of the initialization signal, by a first data format algorithm embedded in the processing unit, to confirm the data format, and performing calculation to the content of the initialization signal, by a second data format algorithm embedded in the MCU, to confirm the data format, wherein the first data format algorithm equals to the second data format algorithm.

16. The protecting method for accessing material data of printer of claim 15, wherein the protecting method further comprises the following steps:
    d) determining whether to transmit a second transmission signal after step c);

e) performing calculation to the content of the first transmission signal at the processing unit and the MCU when the second transmission signal needing to be transmitted, to update the data format; and f) generating and transmitting the second transmission signal through the transmission interface at the processing unit and the MCU according to the data format updated.

17. The protecting method for accessing material data of printer of claim 12, wherein the MCU includes a storing unit, the material data is stored in the storing unit.

* * * * *